United States Patent [19]

Eto

[11] Patent Number: 5,448,478
[45] Date of Patent: Sep. 5, 1995

[54] TORQUE SPLIT CONTROL APPARATUS

[75] Inventor: Yoshiyuki Eto, Isehara, Japan

[73] Assignee: Nissan Motor Co., Ltd., Yokohama, Japan

[21] Appl. No.: 107,145

[22] Filed: Aug. 17, 1993

[30] Foreign Application Priority Data

Sep. 22, 1992 [JP] Japan .................................. 4-252402

[51] Int. Cl.$^6$ ................................................ G01L 5/13
[52] U.S. Cl. ........................ 364/424.1; 364/424.01;
364/426.03; 364/426.01; 180/197; 180/248;
180/233; 475/150; 475/210; 475/205; 475/221;
477/175; 477/903; 477/904; 477/36; 192/60;
192/103 F
[58] Field of Search ........... 364/424.1, 424.03, 426.03,
364/424.05, 424.01, 426.01; 180/249, 197, 248,
247, 233, 242, 243; 475/221, 249, 248, 225, 253,
86, 84, 150, 210, 242, 205; 192/60, 103 F;
74/558, 560, 856, 665 GA; 477/35, 903, 904, 36

[56] References Cited

U.S. PATENT DOCUMENTS

| 4,754,834 | 7/1988 | Ozaki et al. ...................... 180/233 |
|---|---|---|
| 4,757,870 | 7/1988 | Torii et al. ....................... 180/233 |
| 4,766,973 | 8/1988 | Kashihara et al. ................. 180/249 |
| 4,773,500 | 9/1988 | Naito et al. ....................... 180/233 |
| 4,776,424 | 10/1988 | Naito ................................. 180/233 |
| 4,846,298 | 7/1989 | Naito ................................. 180/233 |
| 4,874,056 | 10/1989 | Naito ................................. 180/233 |
| 4,887,689 | 12/1989 | Naito ................................. 180/233 |
| 5,032,995 | 7/1991 | Matsuda et al. .................. 364/424.1 |
| 5,060,747 | 10/1991 | Eto ................................... 364/424.1 |
| 5,080,641 | 1/1992 | Kobayashi ........................ 475/249 |
| 5,098,351 | 3/1992 | Kobayashi ........................ 475/86 |
| 5,132,908 | 7/1992 | Eto et al. .......................... 364/426.03 |
| 5,171,294 | 12/1992 | Takano et al. .................... 475/249 |
| 5,205,797 | 4/1993 | Kobayashi et al. ................ 475/221 |
| 5,219,038 | 6/1993 | Hamada et al. ................... 180/248 |
| 5,301,768 | 4/1994 | Ishikawa et al. .................. 180/249 |

FOREIGN PATENT DOCUMENTS 2-270640  5/1990  Japan .

*Primary Examiner*—Kevin J. Teska
*Assistant Examiner*—Jacques H. Louis-Jacques
*Attorney, Agent, or Firm*—Foley & Lardner

[57] ABSTRACT

A torque split control apparatus for use with an automotive vehicle including an engine for producing a drive. The automotive vehicle is supported on a pair of primary drive wheels and a pair of secondary drive wheels. The drive is transmitted from the engine to the primary drive wheels and to the secondary drive wheels through a torque distributing clutch capable of varying a torque transmitted to the secondary drive wheels. A control torque is calculated based upon a difference between the primary and secondary drive wheel rotational speeds. The control torque is transmitted through the torque distributing clutch to provide a desired turning characteristic to the vehicle. At least one vehicle condition dependent torque, which is dependent on a specified vehicle operating condition, is calculated. Vehicle operating conditions are monitored to produce a command signal when a 4WD control is demanded. The control torque is selected in the absence of the command signal and a greater one of the control torque and the vehicle condition dependent torque is selected in the presence of the command. The torque distributing clutch is controlled to transmit the selected torque to the secondary drive wheels.

9 Claims, 7 Drawing Sheets

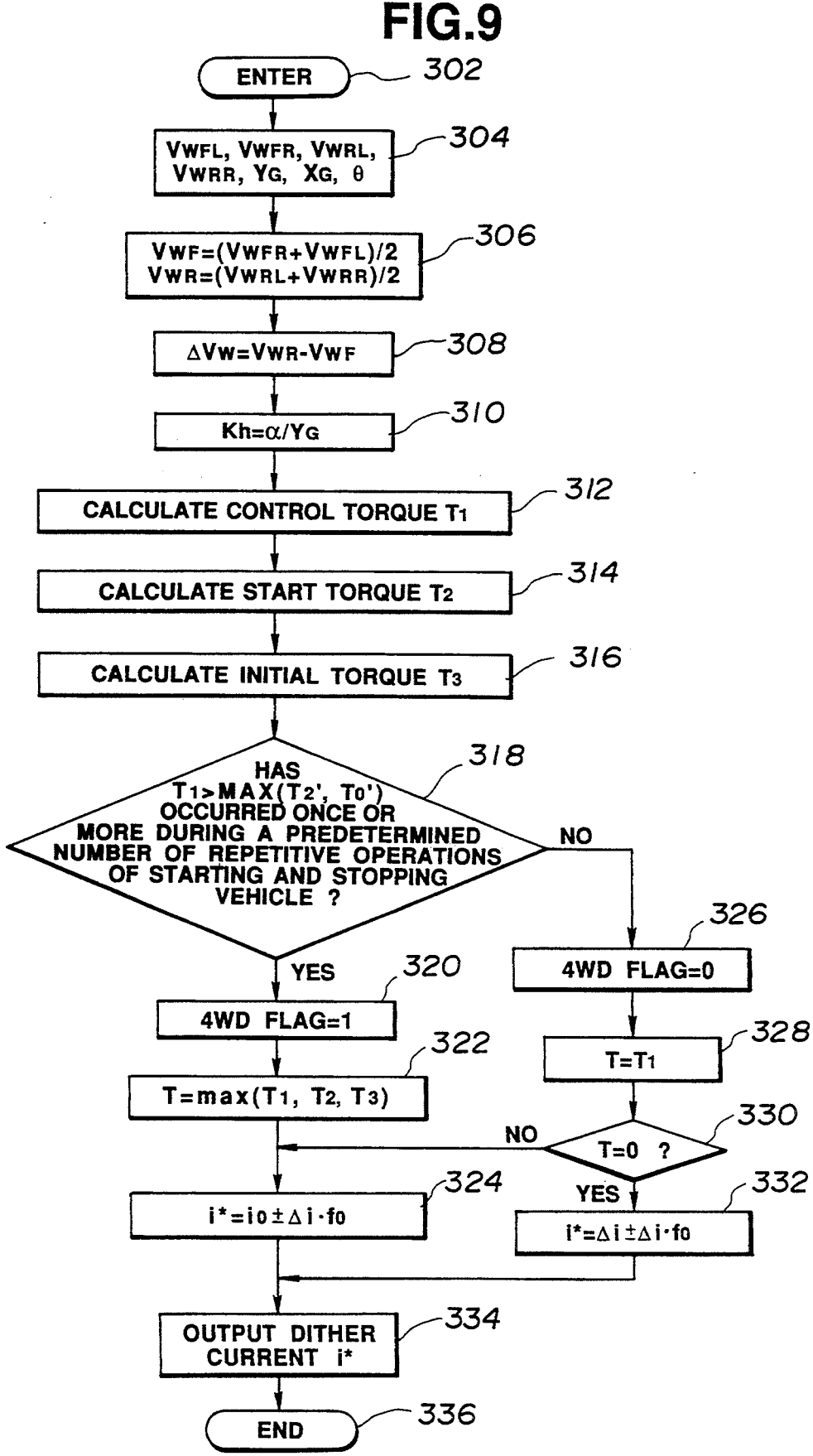

TORQUE SPLIT CONTROL APPARATUS

BACKGROUND OF THE INVENTION

This invention relates to a torque split control apparatus for use with an automotive vehicle supported on a pair of primary drive wheels and a pair of secondary drive wheels.

For example, Japanese Patent Kokai No. 2-270640 discloses a torque split control apparatus for use with a 4WD type automotive vehicle. The conventional torque split control apparatus is arranged to transmit the drive from the engine to the primary drive wheels of the vehicle and to the secondary drive wheels of the vehicle through a torque distributing clutch capable of varying a torque transmit ted to the secondary drive wheels. The torques transmit ted through the torque distributing clutch include a control torque $T_1$, a starting torque $T_2$ and an initial torque $T_3$. The control torque $T_1$, which is directly proportional to the difference between the front and rear road wheel rotational speeds, provides a desired turning characteristic to the vehicle. When the vehicle starts, the vehicle condition dependent torques $T_2$ and $T_3$ are calculated. The starting torque $T_2$, which is in direct proportion to the throttle valve position, provides a sufficient traction without no rear road wheel spin when the vehicle starts on a road surface having a low friction factor. The initial torque $T_3$, which is in direct proportion to the vehicle speed, is used to ensure the control torque $T_1$ to be transmitted without the influence of the oil pressure response delay at a low temperature (for example, $-25°$).

With the conventional torque split control apparatus, however, the vehicle condition dependent torques $T_2$ and $T_3$ are always transmitted through the torque distributing clutch regardless of the road surface friction factor and the ambient temperature. This results in fuel economy loss peculiar to 4WD vehicles.

SUMMARY OF THE INVENTION

Therefore, it is a main object of the invention to provide an improved torque split control apparatus for use with a 4WD vehicle which can eliminate fuel economy loss.

There is provided, in accordance with the invention, a torque split control apparatus for use with an automotive vehicle including an engine for producing a drive. The automotive vehicle is supported on a pair of primary drive wheels and a pair of secondary drive wheels. The torque split control apparatus comprises means for transmitting the drive from the engine to the primary drive wheels and to the secondary drive wheels through a torque distributing clutch capable of varying a torque transmitted to the secondary drive wheels. A wheel speed difference between speeds of rotation of the primary and secondary drive wheels is sensed. A control torque to be transmitted through the torque distributing clutch to provide a desired turning characteristic to the vehicle is calculated based on the sensed wheel speed difference. At least one vehicle condition dependent torque dependent on a specified vehicle operating condition is calculated. Vehicle operating conditions are monitored to produce a command signal when a 4WD control is demanded. The control torque is selected in the absence of the command signal and a greater one of the control torque and the vehicle condition dependent torque is selected in the presence of the command. The torque distributing clutch is controlled to transmit the selected torque to the secondary drive wheels.

BRIEF DESCRIPTION OF THE DRAWINGS

This invention will be described in greater detail by reference to the following description taken in connection with the accompanying drawings, in which:

FIG. 9 is a flow diagram showing the programming of the digital computer used in the torque split control unit included in the second embodiment of the torque split control apparatus of the invention;

DETAILED DESCRIPTION OF THE INVENTION

Figure 1:
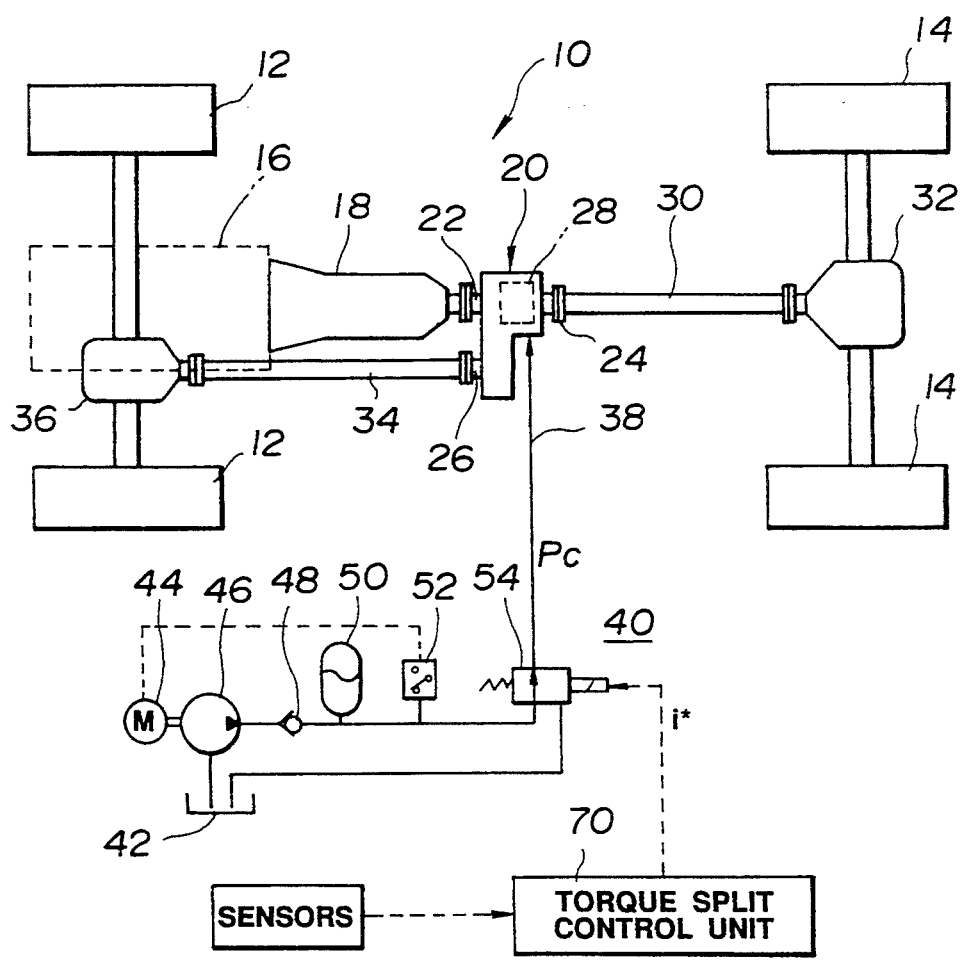
FIG. 1 is a schematic block diagram showing one embodiment of a torque split control apparatus made in accordance with the invention.

With reference to the drawings, and in particular to FIG. 1, there is shown a schematic block diagram of a torque split (driving force distribution) control apparatus embodying the invention. An automotive vehicle, generally designated by the numeral 10, is supported on a pair of front road wheels 12 and a pair of rear road wheels 14. The vehicle 10 includes an internal combustion engine 16 from which the drive is transmitted through a transmission 18 to a transfer 20. The transfer 20 has an input shaft 22 coupled to the transmission 18, a first output shaft 24 coupled to a rear propeller shaft 30 and a second output shaft 26 coupled to a front propeller shaft 34. The transfer 20 directly transmits the drive from the transmission 22 to the rear propeller shaft 30. The drive is then taken by a rear differential 32 which divides the drive equally between the two rear road wheels 14. The transfer 20 also includes a transfer clutch (torque distribution clutch) 28 through which the front propeller shaft 34 is connected to the transmission 18. Thus, the drive from the transmission 18 is transmitted through the transfer clutch 28 to the front propeller shaft 34. The drive is then taken by a front differential 36 which divides the drive equally between the two front road wheels 12. The transfer clutch 28, which may be taken in the form of a wet type multiple disc clutch, is engaged to transmit the torque from the transmission 18 to the front propeller shaft 34 when it receives a control pressure Pc in the form of a hydraulic pressure supplied through a conduit 38 from a pressure source 40. In the absence of the control pressure Pc, the transfer clutch 28 is disengaged to disconnect the torque from the transmission 18 from the front propeller shaft 34. The force under which the transfer clutch 28 is engaged, that is, the ratio of the torques distributed to the front and rear road wheels 12 and 14 of the vehicle 10 is determined by the level of the control pressure Pc supplied from the pressure source 40 through the conduit 38 to the transfer clutch 28. The transfer 20 and the transfer clutch 28 are described in detail, and is incorporated therein by reference, in commonly-assigned, U.S. Pat. Nos. 4,754,834, 4,757,870, 4,773,500, 4,776,424, 4,846,298, 4,874,056 and 4,887,689.

The pressure source 40 includes an oil pump 46 operated by an electric motor 44 to suck oil from an oil reservoir 42. The oil pressure (primary pressure) discharged from the oil pump 46 is introduced through a check valve 48 to charge an accumulator 50. A relief switch 52 is provided to monitor the oil pressure (secondary pressure) charged in the accumulator 50. The relief switch 52 produces a signal to stop the electric motor 44 when the secondary pressure exceeds a predetermined value. Thus, the secondary pressure is maintained at the predetermined value. The regulated pressure is fed through a solenoid valve 54 to the conduit 38. The solenoid valve 54 responds to a dither current i* fed thereto from a torque split control unit 70 by controlling the level of the control pressure Pc fed through the conduit 38 to the transfer clutch 28.

Figure 2:
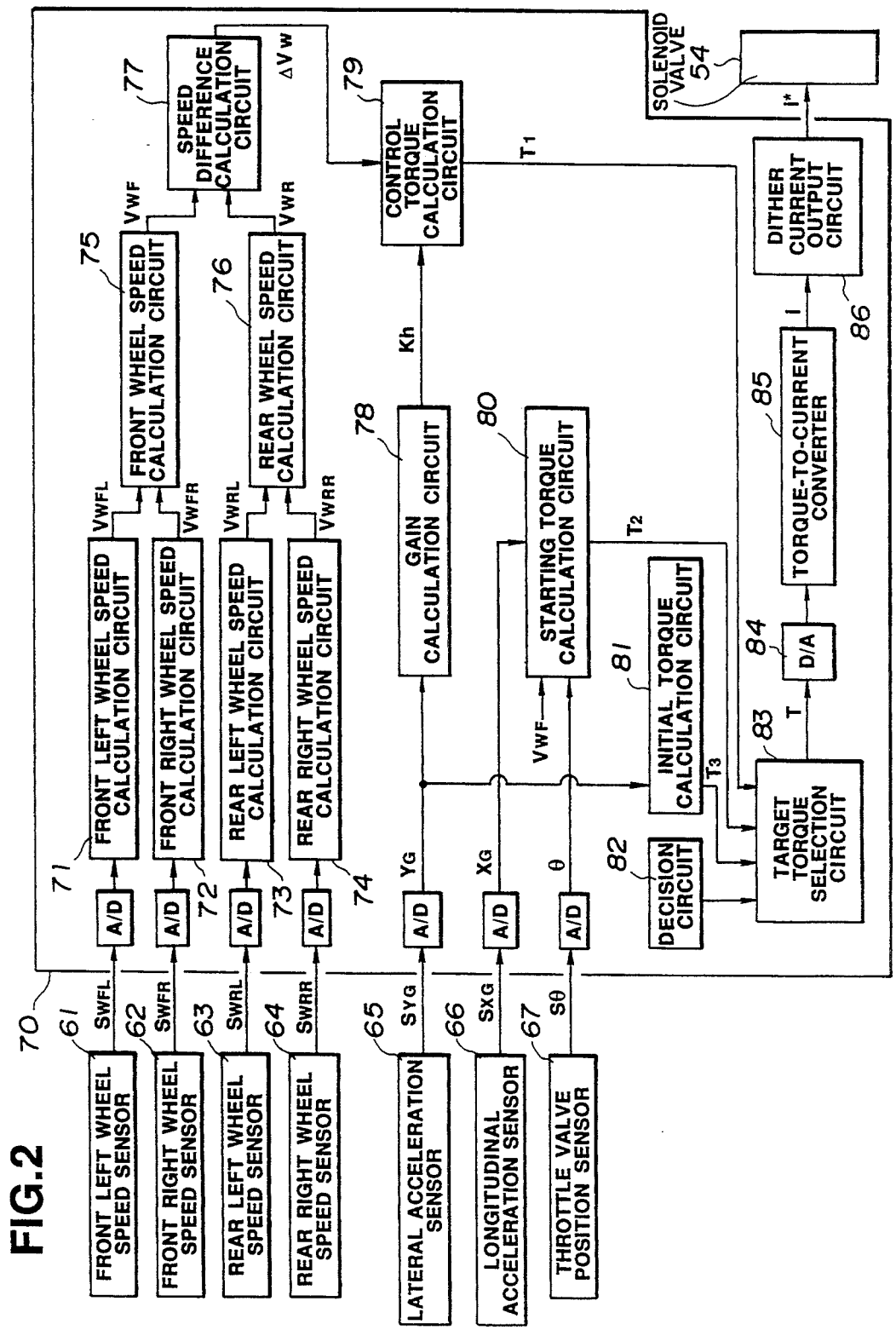
FIG. 2 is a schematic block diagram showing the torque split control unit used in the torque split control apparatus of FIG. 1.

The level of the control pressure Pc introduced through the conduit 38 to the transfer clutch 28, this being determined by the magnitude of the dither current i* supplied from the torque split control unit 70 to the solenoid valve 54, is repetitively determined based upon various conditions that are sensed during its operation. These sensed conditions include front road wheel rotational speed, rear road wheel rotational speed, lateral acceleration, longitudinal acceleration, and throttle valve position. Thus, a front left road wheel rotational speed sensor 61, a front right road wheel rotational speed sensor 62, a rear left road wheel rotational speed sensor 63, a rear right road wheel rotational speed sensor 64, a lateral acceleration sensor 65, a longitudinal acceleration sensor 66, and a throttle valve position sensor 67 are connected to the torque split control unit 70, as shown in FIG. 2. The front left road wheel rotational speed sensor 61 is positioned to sense the speed of rotation of the front left road wheel and it produces a signal $S_{WFL}$ indicative of the sensed front left road wheel rotational speed. The front right road wheel rotational speed sensor 62 is positioned to sense the speed of rotation of the front right road wheel and it produces a signal $S_{WFR}$ indicative of the sensed front right road wheel rotational speed. The rear left road wheel rotational speed sensor 63 is positioned to sense the speed of rotation of the rear left road wheel and it produces a signal $S_{WRL}$ indicative of the sensed rear left road wheel rotational speed. The rear right road wheel rotational speed sensor 64 is positioned to sense the speed of rotation of the rear right road wheel and it produces a signal $S_{WRR}$ indicative of the sensed rear right road wheel rotational speed. The lateral acceleration sensor 65 is positioned to sense the lateral acceleration of the vehicle 10 and it produces a signal $S_{YG}$ indicative of the sensed lateral acceleration. The longitudinal acceleration sensor 66 is positioned to sense the longitudinal acceleration of the vehicle 10 and it produces a signal $S_{XG}$ indicative of the sensed longitudinal acceleration. The throttle valve position sensor 67 is positioned to sense the degree of opening of the throttle valve provided to control the amount of air to the engine 16.

The torque split control unit 70 includes a front left road wheel rotational speed calculation circuit 71, a front right road wheel rotational speed calculation circuit 72, a rear left road wheel rotational speed calculation circuit 73, and a rear right road wheel rotational speed calculation circuit 74. The signal $S_{WFL}$ is fed from the front left road wheel rotational speed sensor 61 through an analog-to-digital converter (A/D) to the front left road wheel rotational speed calculation circuit 71 which calculates the front left road wheel rotational speed $V_{WFL}$. The calculated front left road wheel rotational speed $V_{WFL}$ is fed from the front left road wheel rotational speed calculation circuit 71 to a front wheel rotational speed calculation circuit 75. The signal $S_{WFR}$ is fed from the front right road wheel rotational speed sensor 62 through an analog-to-digital converter (A/D) to the front right road wheel rotational speed calculation circuit 72 which calculates the front right road wheel rotational speed $V_{WFR}$. The calculated front right road wheel rotational speed $V_{WFR}$ is fed from the front right road wheel rotational speed calculation circuit 72 to the front wheel rotational speed calculation circuit 75 which calculates the front road wheel rotational speed $V_{WF}$ by averaging the front wheel rotational speeds $V_{WFL}$ and $V_{WFR}$. The signal $S_{WRL}$ is fed from the rear left road wheel rotational speed sensor 63 through an analog-to-digital converter (A/D) to the rear left road wheel rotational speed calculation circuit 73 which calculates the rear left road wheel rotational speed $V_{WRL}$. The calculated rear left road wheel rotational speed $V_{WRL}$ is fed from the rear left road wheel rotational speed calculation circuit 73 to a rear wheel rotational speed calculation circuit 76. The signal $S_{WRR}$ is fed from the rear right road wheel rotational speed sensor 64 through an analog-to-digital converter (A/D) to the rear right road wheel rotational speed calculation circuit 74 which calculates the rear right road wheel rotational speed $V_{WRR}$. The calculated rear right road wheel rotational speed $V_{WRR}$ is fed from the rear right road wheel rotational speed calculation circuit 74 to the rear wheel rotational speed calculation circuit 76 which calculates the rear wheel rotational speed $V_{WR}$ by averaging the rear wheel rotational speeds $V_{WRL}$ and $V_{WRR}$. The calculated speeds $V_{WF}$ and $V_{WR}$ are fed to a speed difference calculation circuit 77 which calculates a difference $\Delta V_W$ between the front and rear road wheel rotational speeds $V_{WF}$ and $V_{WR}$.

The signal $S_{YG}$ is fed from the lateral acceleration sensor 65 through an analog-to-digital converter (A/D) to a gain calculation circuit 78 and also to an initial torque calculation circuit 81. The gain calculation circuit 78 calculates a control gain $K_h$ based on the sensed lateral acceleration $Y_G$. The calculated control gain $K_h$ is fed to a control torque calculation circuit 79 which receives the calculated speed difference $\Delta V_W$ from the rotational speed difference calculation circuit 77. The control torque calculation circuit 79 calculates a control torque $T_1$ based on the calculated values kh and $\Delta V_W$. The calculated control torque $T_1$ is fed to a target torque selection circuit 83. The signal $S_{XG}$ is fed from the longitudinal acceleration sensor 66 through an analog-to-digital converter (A/D) to a starting torque calculation circuit 80. The signal $S\theta$ is fed from the throttle valve position sensor 67 through an analog-to-digital converter (A/D) to the starting torque calculation circuit 80. The starting torque calculation circuit 80 also receives the front wheel rotational speed signal $V_{WF}$ and it calculates a starting torque $T_2$ based upon the sensed longitudinal acceleration $X_G$, the sensed throttle valve position $\theta$ and the calculated front road wheel rotational speed $V_{WF}$. The calculated starting torque $T_2$ is fed to the target torque selection circuit 83. The initial torque calculation circuit 79 calculates an initial torque $T_3$ based on the sensed lateral acceleration $Y_G$. The calculated initial torque $T_3$ is fed to the target torque selection circuit 83. The target torque selection circuit 83 also receives a signal from a decision circuit 82 when the vehicle running condition requires a 4WD control. The target torque selection circuit 83 produces a signal T indicative of a target torque to be achieved at the transfer clutch 28. The signal T is fed from the target torque selection circuit 83 through a digital-to-analog converter (D/A) 84 to a torque-to-current (T/i) converter circuit 85 which converts the target torque indication signal T into a corresponding current i. The current i is fed from the T/i converter circuit 85 to a dither current output circuit 86 which produces a dither current i* to the solenoid valve 54 so as to produce the target torque at the transfer clutch 28.

The torque split control unit 70 may employ a digital computer which includes a central processing unit (CPU), a random access memory (RAM), a read only memory (ROM), and an input/output control circuit (I/O). The central processing unit communicates with the rest of the computer via data bus. The read only memory contains the program for operating the central processing unit and further contains appropriate data in look-up tables used in calculating an appropriate value for the dither current i* supplied to the solenoid valve 54. A control word specifying a desired dither current magnitude is periodically transferred by the central processing unit to the converters 84 and 85 which converts the received control word into a corresponding dither current i* for application to the solenoid valve 54.

Figure 3:
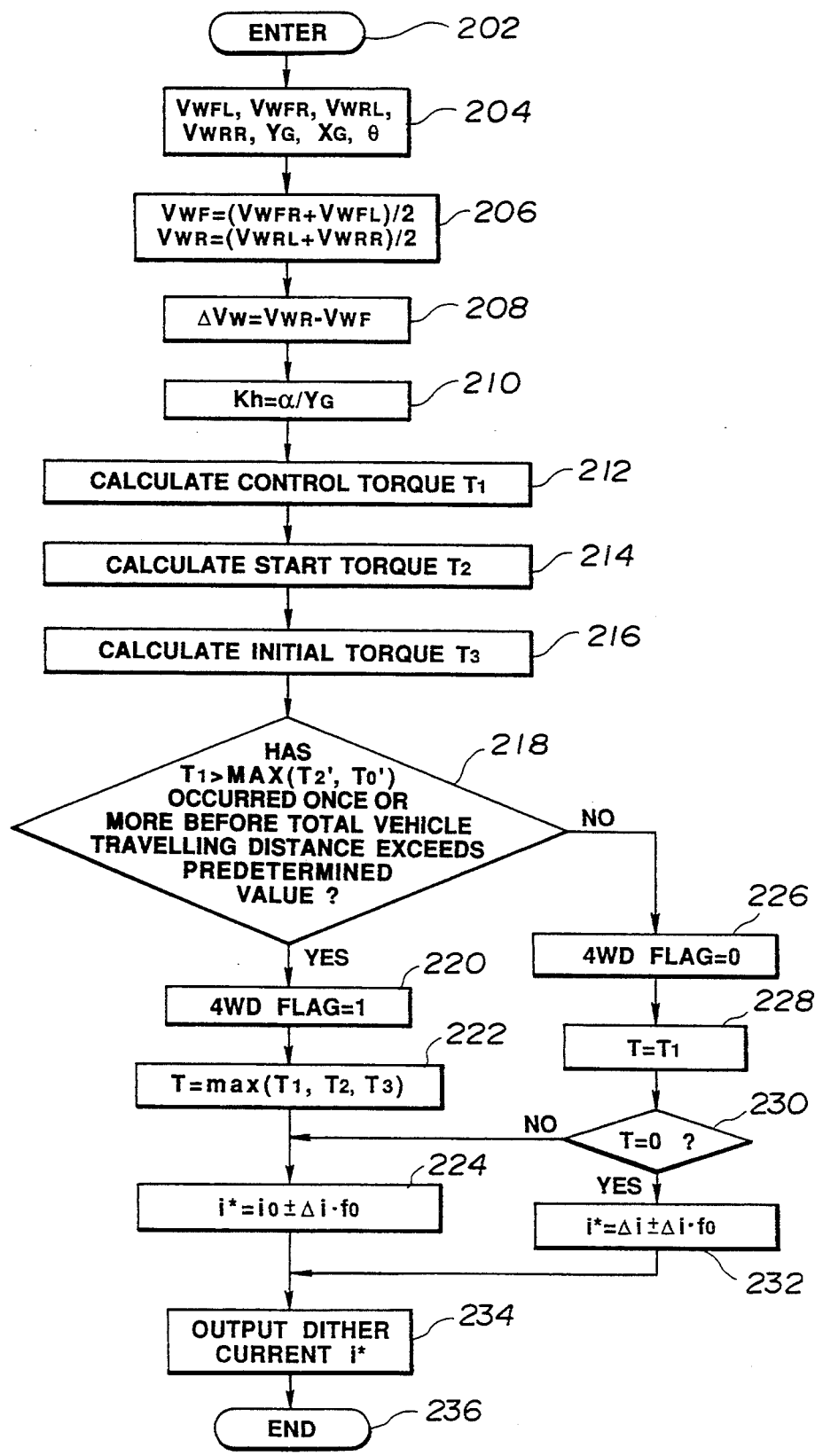
FIG. 3 is a flow diagram showing the programming of the digital computer used in the torque split control unit of FIG. 2.

FIG. 3 is a flow diagram showing the programming of the digital computer used in the torque split control unit 70 to calculate an appropriate value for the dither current i* supplied to the solenoid valve 54. The computer program is entered at the point 202 at uniform intervals of time (for example, 10 msec). At the point 204 in the program, the front left road wheel rotational speed $V_{WFL}$, the front right road wheel rotational speed $V_{WFR}$, the rear left road wheel rotational speed $V_{WRR}$, the rear right road wheel rotational speed $V_{WRR}$, the lateral acceleration $Y_G$, the longitudinal acceleration $X_G$ and the throttle valve position $\theta$ are read into the computer memory. At the point 206 in the program, the central processing unit calculates the front road wheel rotational speed $V_{WF}$ by averaging the front left and right road wheel rotational speeds $V_{WFL}$ and $V_{WFR}$ and the rear road wheel rotational speed $V_{WR}$ by averaging the rear left and right road wheel rotational speeds $V_{WRL}$ and $V_{WRR}$.

Figure 4:
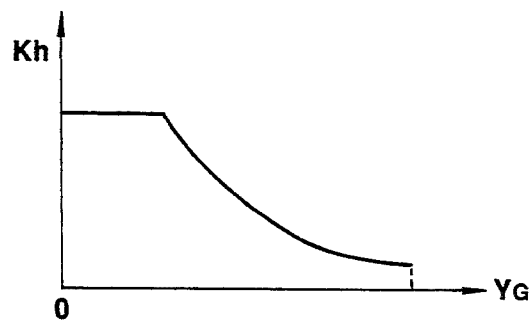
FIG. 4 is a graph of control gain ($K_h$) versus lateral acceleration ($Y_G$)

At the point 208 in the program, the front and rear road wheel rotational speed difference $\Delta V_W(\geq 0)$ of the front road wheel rotational speed $V_{WF}$ from the rear road wheel rotational speed $V_{WR}$ is calculated. At the point 210 in the program, the control gain $K_h$ of the control torque $T_1$ with respect to the front and rear road wheel rotational speed difference $\Delta V_W$ is calculated based on the reciprocal of the lateral acceleration $Y_G$ from the equation as follows:

$$K_h = \alpha_h / Y_G$$

where $K_h \leq \beta_h$. For example, $\beta_h = 10$ when $\alpha_h = 1$. The control gain $K_h$, which is determined as a function of lateral acceleration $Y_G$, as shown in FIG. 4, is selected to provide a linear neutral steer characteristic for any road surface friction factor.

Figure 5:
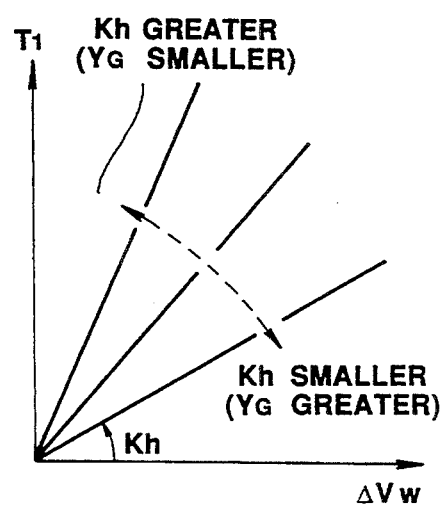
FIG. 5 is a graph of control torque ($T_1$) versus front and rear road wheel rotational speed difference ($\Delta V_W$)

At the point 212 in the program, the central processing unit calculates the control torque $T_1$ by multiplying the control gain $K_h$ and the front and rear road wheel rotational speed difference $\Delta V_W$. The control torque $T_1$ may be calculated with the use of a relationship that specifies the control torque $T_1$ as a function of control gain $K_h$ and road wheel rotational speed difference a $\Delta V_W$, as shown in FIG. 5.

Figure 6:
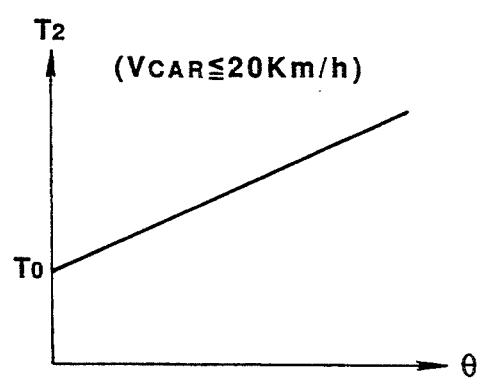
FIG. 6 is a graph of starting torque ($T_2$) versus throttle valve position ($\theta$)

At the point 214 in the program, the starting torque $T_2$ is calculated as a function of vehicle speed $V_{CAR}$ and throttle valve position $\theta$. The vehicle speed $V_{CAR}$ is calculated as a function of front road wheel rotational speed $V_{WF}$ and longitudinal acceleration $X_G$. For example, the starting torque $T_2$ is calculated as $T_2 = 0$ when the vehicle speed $V_{CAR}$ is less than 20 km/h and as $T_2 = K' \cdot \theta + T_0$ (where K' and $T_0$ are constants) when the vehicle speed $V_{CAR}$ is equal to or greater than 20 km/h, as shown in FIG. 6, where $K' = 0.5$ kgm/deg and $T_0 = 4$ kgm. The starting torque $T_2$ may be set to be produced only when the throttle valve position $\theta$ exceeds a predetermined value $\theta_0$. In this case, the starting torque $T_2$ may be calculated as $T_2 = 0$ when the vehicle speed $V_{CAR}$ is less than 20 km/h and $T_2 = K' \cdot (\theta - \theta_0) + T_0$ when the vehicle speed $V_{CAR}$ is equal to or greater than 20 km/h. For example, the predetermined value $\theta_0$ may be 30 degrees with respect to the closed position of the throttle valve.

Figure 7:
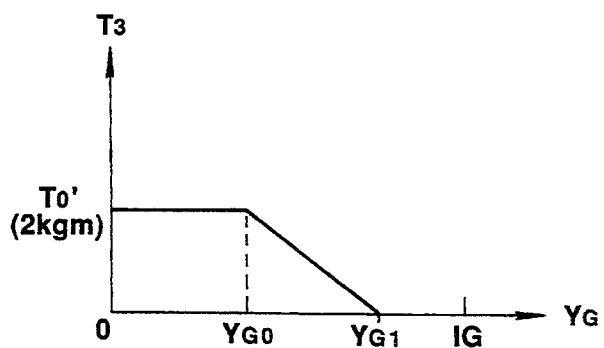
FIG. 7 is a graph of initial torque ($T_3$) versus lateral acceleration ($Y_G$)

At the point 216 in the program, the initial torque $T_3$ is calculated as a function of lateral acceleration $Y_G$. In order to permit slip at the transfer clutch 28 in the presence of a lateral acceleration produced when the vehicle is moving in a curved path, the initial torque $T_3$ is set at a smaller value as the lateral acceleration $Y_G$ increases. FIG. 7 shows a relationship that specifies the initial torque $T_3$ as a function of lateral acceleration $Y_G$ where $T'_0$ is the initial torque (2 kgm) set for the vehicle moving in a straight line, $Y_{G0}$ is 0.45 (G) and $Y_{G1}$ is 0.6 (G).

Figure 8:
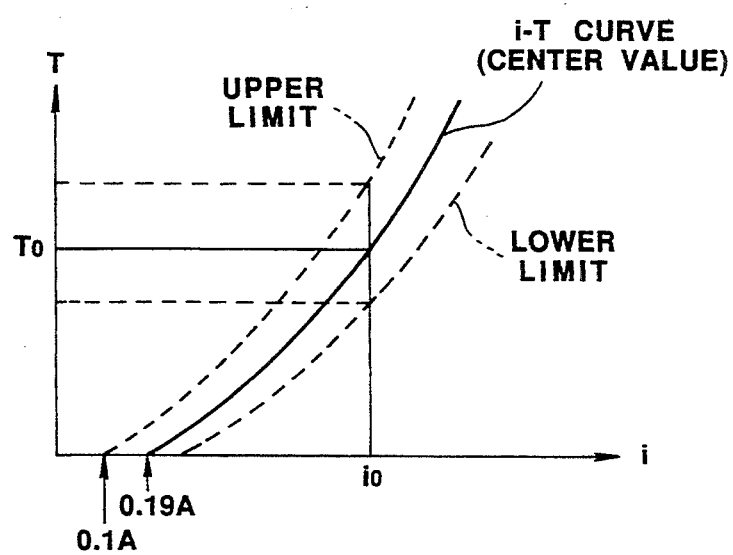
FIG. 8 is a graph of target torque (T) versus drive current (i)
Figure 11:
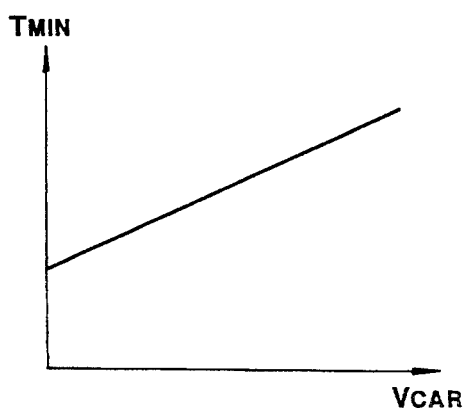
FIG. 11 is a graph of minimum torque ($T_{min}$) versus vehicle speed ($V_{CAR}$).

At the point 218 in the program, a determination is made as to whether or not a condition where the control torque $T_1$ is greater than the greater one of the torques $T_2'$ and $T_0$ occurs once or more before the accumulated vehicle travelling distance exceeds a predetermined value $L_0$ (for example, 1000 km), where $T_2'$ is the starting torque set as $T_2' = 0$ when the vehicle speed $V_{CAR}$ is less than 20 km and set as $T_2' = T_0$ when the vehicle speed $V_{CAR}$ is equal to or greater than 20 km, and $T_0'$ is the initial torque $T_3$ set when the vehicle is moving in a straight line. If the answer to this question is "yes", then it means that the vehicle is running on a road surface having a low friction factor requiring an appropriate 4WD control and the program proceeds to the point 220 where a 4WD flag is set at 1. The drive wheel will slip even with a somewhat excessive degree of depression of the accelerator pedal when the vehicle is moving on a road surface having a low friction factor. For this reason, the control torque $T_1$, which is proportional to the difference between the front and rear road wheels, will exceed either of the starting torque $T_2'$ and the initial torque $T_0'$. Although the road surface friction factor is inferred from data sampled for a long time, it is to be noted that it may be inferred from data sampled for a short time. For example, a high road surface friction factor is determined when the period during which the control torque $T_1$ remains at a minimum value $T_{min}$ exceeds a predetermined time for a predetermined number of (for example, 50) repetitive operations of starting and stopping the vehicle. After the 4WD flag is set, at the point 222, the target torque T is set at the greatest one of the control torque $T_1$, the starting torque $T_2$ and the initial torque $T_3$. At the point 224 in the program, a torque-current characteristic table (FIG. 8) is used to calculate a dither current i* based on the solenoid drive current $i_0$ corresponding to the target torque T as $i^* = i_0 \pm \Delta i \cdot f_0$. For example, $\Delta i = 0.1$ A, $f_0 = 100$ Hz. Following this, the program proceeds to the point 234.

If the answer to the question inputted at the point 218 is "no", then it means that no 4WD control is required and the program proceeds to the point 226 where the 4WD flag is cleared to zero. After the 4WD flag is cleared, at the point 228, the target torque T is set at the control torque $T_1$. At the point 230 in the program, a determination is made as to whether or not the target torque T is zero. If the answer to this question is "no", then the program proceeds to the point 224. Otherwise, the program proceeds to the point 232 where the dither current i* is set at its minimum value required to assure the dither amplitude as $i^* = \Delta i \pm \Delta i \cdot f_0$. Following this, the program proceeds to the point 234.

A t the point 234 in the program, a dither current i* (for example, i±0.1A, 100 Hz) is supplied to the solenoid valve 54 so as to provide the target torque T at the transfer clutch 28. Following this, the program proceeds to the end point 236.

The operation of the torque split control apparatus of the invention will be described further. When the vehicle is moving on a road surface having a high friction factor and no 4WD control is required, the target torque T is set at a value equal to the control torque $T_1$. In this case, the torque split control unit 70 controls the solenoid valve 54 in a manner to provide the control torque $T_1$ at the transfer clutch 28. Thus, the vehicle operates in a 2WD mode where the transfer clutch 28 is released as long as there is no front and rear road wheel rotational speed difference. This is effective to provide improved fuel economy as compared to the case where the initial torque $T_3$ is always applied or the case where a great starting torque $T_2$ is applied for starting the vehicle. Furthermore, the dither current i* is set at a smallest possible value required to assure the dither amplitude. This is effective to provide further improved fuel economy and to ensure good initial response when a 4WD control is started. It is to be understood that the torque split control unit can ensure good vehicle turning performance by producing a control torque $T_1$ corresponding to a difference between the front and rear road wheel rotational speeds.

When an appropriate 4WD control is required for the vehicle moving on a road surface having a low friction factor, the target torque T is set at a value equal to the greatest one of the control torque $T_1$, the starting torque $T_2$ and the initial torque $T_3$. Thus, it is possible to ensure an appropriate 4WD control. The starting torque $T_2$ is effective to ensure the starting traction even when the vehicle starts on a road surface having a low friction factor. The initial torque $T_3$ is effective to eliminate the possibility of a slow oil pressure response at low temperatures. The initial torque $T_3$ is effective to improve the stability when the vehicle is moving at high speeds in a straight line.

Description will be made to a second embodiment of the torque split control apparatus of the invention. This embodiment is substantially the same in the hardware arrangement as the first embodiment. FIG. 9 is a flow diagram showing the programming of the digital computer used in the torque split control unit 70 included in the second embodiment of the torque split control apparatus of the invention. The computer program is entered at the point 302 at uniform intervals of time (for example, 10 msec). At the point 304 in the program, the front 1 eft road wheel rotational speed $V_{WFL}$, the front right road wheel rotational speed $V_{WFR}$, the rear left road wheel rotational speed $V_{WRL}$, the rear right road wheel rotational speed $V_{WRR}$, the lateral acceleration $Y_G$, the longitudinal acceleration $X_G$ and the throttle valve position $\theta$ are read into the computer memory. At the point 306 in the program, the central processing unit calculates the front road wheel rotational speed $V_{WF}$ by averaging the front left and right road wheel rotational speeds $V_{WFL}$ and $V_{WFR}$ and the rear road wheel rotational speed $V_{WR}$ by averaging the rear left and right road wheel rotational speeds $V_{WRL}$ and $V_{WRR}$.

At the point 308 in the program, the front and rear road wheel rotational speed difference $\Delta V_W (\geq 0)$ of the front road wheel rotational speed $V_{WF}$ from the rear road wheel rotational speed $V_{WR}$ is calculated. At the point 310 in the program, the control gain $K_h$ of the control torque $T_1$ with respect to the front and rear road wheel rotational speed difference $\Delta V_W$ is calculated based on the reciprocal of the lateral acceleration $Y_G$ from the equation as follows:

$$K_h = a_h / Y_G$$

where $K_h \leq \beta_h$. For example, $\beta_h = 10$ when $a_h = 1$. The control gain $K_h$, which is determined as a function of lateral acceleration $Y_G$, as shown in FIG. 4, is selected to provide a linear neutral steer characteristic for any road surface friction factor.

At the point 312 in the program, the central processing unit calculates the control torque $T_1$ by multiplying the control gain $K_h$ and the front and rear road wheel rotational speed difference $\Delta V_W$. The control torque $T_1$ may be calculated with the use of a relationship that specifies the control torque $T_1$ as a function of control gain $K_h$ and road wheel rotational speed difference $\Delta V_W$, as shown in FIG. 5.

At the point 314 in the program, the starting torque $T_2$ is calculated as a function of vehicle speed $V_{CAR}$ and throttle valve position $\Delta$. The vehicle speed $V_{CAR}$ is calculated as a function of front road wheel rotational speed $V_{WF}$ and longitudinal acceleration $X_G$. For example, the starting torque $T_2$ is calculated as $T_2 = 0$ when the vehicle speed $V_{CAR}$ is less than 20 km/h and as $T_2 = K' \cdot \theta + T_0$ (where K' and $T_0$ are constants) when the vehicle speed $V_{CAR}$ is equal to or greater than 20 km/h, as shown in FIG. 6, where $K' = 0.5$ kgm/deg and $T_0 = 4$ kgm. The starting torque $T_2$ may be set to be produced only when the throttle valve position $\theta$ exceeds a predetermined value $\theta_0$. In this case, the starting torque $T_2$ may be calculated as $T_2 = 0$ when the vehicle speed $V_{CAR}$ is less than 20 km/h and $T_2 = K' \cdot (\theta - \theta_0)) + T_0$ when the vehicle speed $V_{CAR}$ is equal to or greater than 20 km/h. For example, the predetermined value $\theta_0$ may be 30 degrees with respect to the closed position of the throttle valve.

At the point 316 in the program, the initial torque $T_3$ is calculated as a function of lateral acceleration $Y_G$. In order to permit slip at the transfer clutch 28 in the presence of a lateral acceleration produced when the vehicle is moving in a curved path, the initial torque $T_3$ is set at a smaller value as the lateral acceleration $Y_G$ increases. FIG. 7 shows a relationship that specifies the initial torque $T_3$ as a function of lateral acceleration $Y_G$ where $T'_0$ is the initial torque (2 kgm) set for the vehicle moving in a straight line, $Y_{G0}$ is 0.45 (G) and $Y_{G1}$ is 0.6 (G).

At the point 318 in the program, a determination is made as to whether or not a condition where the control torque $T_1$ is greater than the greater one of the torques $T_2'$ and $T_0'$ occurs once or more during a predetermined number of (for example, 5) repetitive operations of starting and stopping the vehicle, where $T_2'$ is the starting torque set as $T_2'=0$ when the vehicle speed $V_{CAR}$ is less than 20 km and set as $T_2'=T_0$ when the vehicle speed $V_{CAR}$ is equal to or greater than 20 km, and $T_0'$ is the initial torque $T_3$ set when the vehicle is moving in a straight line. If the answer to this question is "yes", then it means that the vehicle is running on a road surface having a low friction factor requiring an appropriate 4WD control and the program proceeds to the point 320 where a 4WD flag is set at 1. The drive wheel will slip even with a somewhat excessive degree of depression of the accelerator pedal when the vehicle is moving on a road surface having a low friction factor. For this reason, the control torque $T_1$, which is proportional to the difference between the front and rear road wheels, will exceeds either of the starting torque $T_2'$ and the initial torque $T_0'$. Although the road surface friction factor is inferred from data sampled for a long time, it is to be noted that it may be inferred from data sampled for a short time. For example, a high road surface friction factor is determined when the period during which the control torque $T_1$ remains at a minimum value $T_{min}$ exceeds a predetermined time for a predetermined number of (for example, 50) repetitive operations of starting and stopping the vehicle. After the 4WD flag is set, at the point 322, the target torque T is set at the greatest one of the control torque $T_1$, the starting torque $T_2$ and the initial torque $T_3$. At the point 324 in the program, a torque-current characteristic table (FIG. 8) is used to calculate a dither current i* based on the solenoid drive current $i_0$ corresponding to the target torque T as $i^* = i_0 \pm \Delta i \cdot f_0$. For example, $\Delta i = 0.1$ A, $f_0 = 100$ Hz. Following this, the program proceeds to the point 334.

If the answer to the question inputted at the point 318 is "no", then it means that no 4WD control is required and the program proceeds to the point 326 where the 4WD flag is cleared to zero. After the 4WD flag is cleared, at the point 328, the target torque T is set at the control torque $T_1$. At the point 330 in the program, a determination is made as to whether or not the target torque T is zero. If the answer to this question is "no", then the program proceeds to the point 324. Otherwise, the program proceeds to the point 332 where the dither current i* is set at its minimum value required to assure the dither amplitude as $i^* = \Delta i \pm \Delta i \cdot f_0$. Following this, the program proceeds to the point 334.

At the point 334 in the program, a dither current i* (for example, $i \pm 0.1A$, 100 Hz) is supplied to the solenoid valve 54 so as to provide the target torque T at the transfer clutch 28. Following this, the program proceeds to the end point 336.

The main difference between the first and second embodiments is the determination step at the point 318. The 4WD control is judged to be required when a condition of $T_1 > \max(T_2', T_0')$ occurs once or more during a predetermined number of (for example, 5) repetitive operations of starting and stopping the vehicle. That is, the road surface friction factor is inferred from data sampled for a long time in the first embodiment, whereas the road surface friction factor is inferred from data sampled for a short time in the second embodiment. It is possible in the second embodiment to infer the road surface friction factor during one vehicle travelling interval between the time at which the ignition switch is turned on and the time at which the ignition switch is turned off. The road surface friction factor is newly inferred for the next vehicle travelling interval. Thus, this embodiment is applicable to a torque split control unit 70 having no battery backup circuit. It is to be noted that the determination as to whether or not the 4WD control is required may be made based upon detection of a high road surface friction factor. For example, a high road surface friction factor is judged when the period during which the control torque $T_1$ remains at a minimum value $T_{min}$ exceeds a predetermined time for an interval between the time at which the ignition switch is turned on and the time at which the ignition switch is turned off.

Figure 10:
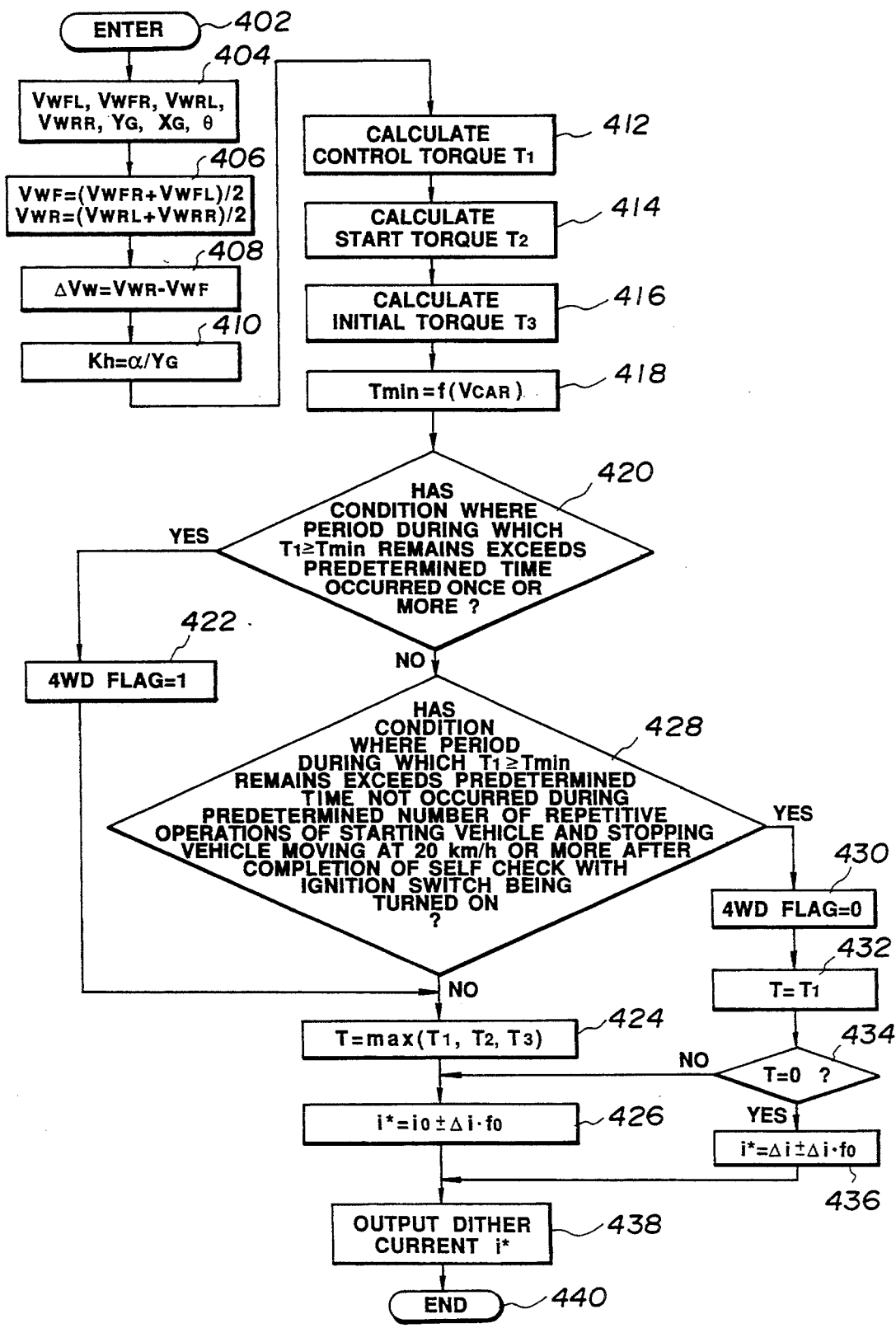
FIG. 10 is a flow diagram showing the programming of the digital computer used in the torque split control unit included in the third embodiment of the torque split control apparatus of the invention.

Description will be made to a third embodiment of the torque split control apparatus of the invention. This embodiment is substantially the same in the hardware arrangement as the first embodiment. FIG. 10 is a flow diagram showing the programming of the digital computer used in the torque split control unit 70 included in the third embodiment of the torque split control apparatus of the invention. The computer program is entered at the point 402 at uniform intervals of time (for example, 10 msec). At the point 404 in the program, the front left road wheel rotational speed $V_{WFL}$, the front right road wheel rotational speed $V_{WFR}$, the rear left road wheel rotational speed $V_{WRL}$, the rear right road wheel rotational speed $V_{WRR}$, the lateral acceleration $Y_G$, the longitudinal acceleration $X_G$ and the throttle valve position $\theta$ are read into the computer memory. At the point 406 in the program, the central processing unit calculates the front road wheel rotational speed $V_{WF}$ by averaging the front left and right road wheel rotational speeds $V_{WFL}$ and $V_{WFR}$ and the rear road wheel rotational speed $V_{WR}$ by averaging the rear left and right road wheel rotational speeds $V_{WRL}$ and $V_{WRR}$.

At the point 408 in the program, the front and rear road wheel rotational speed difference $\Delta V_W (\geq 0)$ of the front road wheel rotational speed $V_{WF}$ from the rear road wheel rotational speed $V_{Wr}$ is calculated. At the point 410 in the program, the control gain $K_h$ of the control torque $T_1$ with respect to the front and rear road wheel rotational speed difference $\Delta V_W$ is calculated based on the reciprocal of the lateral acceleration $Y_G$ from the equation as follows:

$$K_h = \alpha_h / Y_G$$

where $K_h \geq \beta_h$. For example, $\beta_h = 10$ when $\alpha_h = 1$. The control gain $K_h$, which is determined as a function of lateral acceleration $Y_G$, as shown in FIG. 4, is selected to provide a linear neutral steer characteristic for any road surface friction factor.

At the point 412 in the program, the central processing unit calculates the control torque $T_1$ by multiplying the control gain $K_h$ and the front and rear road wheel rotational speed difference $\Delta V_W$. The control torque $T_1$ may be calculated with the use of a relationship that specifies the control torque $T_1$ as a function of control gain $K_h$ and road wheel rotational speed difference $\Delta V_W$, as shown in FIG. 5.

At the point 414 in the program, the starting torque $T_2$ is calculated as a function of vehicle speed $V_{CAR}$ and throttle valve position $\theta$. The vehicle speed $V_{CAR}$ is calculated as a function of front road wheel rotational speed $V_{WF}$ and longitudinal acceleration $X_G$. For example, the starting torque $T_2$ is calculated as $T_2=0$ when the vehicle speed $V_{CAR}$ is less than 20 km/h and as $T_2=K' \cdot \theta + T_0$ (where $K'$ and $T_0$ are constants) when the vehicle speed $V_{CAR}$ is equal to or greater than 20 km/h, as shown in FIG. 6, where $K'=0.5$ kgm/deg and $T_0=4$ kgm. The starting torque $T_2$ may be set to be produced only when the throttle valve position $\theta$ exceeds a predetermined value $\theta_0$. In this case, the starting torque $T_2$ may be calculated as $T_2 32\ 0$ when the vehicle speed $V_{CAR}$ is less than 20 km/h and $T_2=K'19\ (\theta-\theta_0)+T_0$ when the vehicle speed $V_{CAR}$ is equal to or greater than 20 km/h. For example, the predetermined value $\theta_0$ may be 30 degrees with respect to the closed position of the throttle valve.

At the point 416 in the program, the initial torque $T_3$ is calculated as a function of lateral acceleration $Y_G$. In order to permit slip at the transfer clutch 28 in the presence of a lateral acceleration produced when the vehicle is moving in a curved path, the initial torque $T_3$ is set at a smaller value as the lateral acceleration $Y_G$ increases. FIG. 7 shows a relationship that specifies the initial torque $T_3$ as a function of lateral acceleration $Y_G$ where $T'_0$ is the initial torque (2 kgm) set for the vehicle moving in a straight line, $Y_{G0}$ is 0.45 (G) and $Y_{G1}$ is 0.6 (G).

At the point 418 in the program, a minimum torque $T_{min}$ is calculated as a function of vehicle speed $V_{CAR}$. For example, the minimum torque $T_{min}$ may be calculated as $T_{min}=4$ when the vehicle speed $V_{CAR}$ is equal to or less than 20 km/h and calculated as $T_{min}=8$ when the vehicle speed $V_{CAR}$ is greater than 20 km/h. Alternatively, the minimum torque $T_{min}$ may be calculated from a relationship programmed in the computer memory. This relationship is shown in FIG. 1I and it specifies the minimum torque $T_{min}$ as a function of vehicle speed $V_{CAR}$.

At the point 420 in the program, a determination is made as to whether or not a condition where the period during which the control torque $T_1$ remains equal to or greater than the minimum torque $T_{min}$ exceeds a predetermined time (for example, 250 msec) occurs once or more after a 4WD flag is cleared to zero. The 4WD flag is initially set at 1. If the answer to this question is "yes", then it means that the vehicle is running on a road surface having a low friction factor requiring an appropriate 4WD control and the program proceeds to the point 422 where the 4WD flag is set at 1. After the 4WD flag is set, at the point 424, the target torque T is set at the greatest one of the control torque $T_1$, the starting torque $T_2$ and the initial torque $T_3$. At the point 426 in the program, a torque-current characteristic table (FIG. 8) is used to calculate a dither current $i^*$ based on the solenoid drive current $i_0$ corresponding to the target torque T as $i^*=i_0\pm\Delta i \cdot f_0$. For example, $\Delta i=0.1$ A, $F_0=100$ Hz. Following this, the program proceeds to the point 438.

If the answer to the question inputted at the point 420 is "no", then the program proceeds to another determination step at the point 428. This determination is as to whether or not a condition where the period during which the control torque $T_1$ remains equal to or greater than the minimum torque $T_{min}$ exceeds a predetermined time (for example, 250 msec) does not occur during a predetermined number of (for example, 2) repetitive operations of starting the vehicle and stopping the vehicle moving at 20 km/h or more after the completion of a self check with the ignition switch being turned on. If the answer to this question is "yes", then it means that the vehicle moves on a road surface having a high friction factor requiring no 4WD control and the program proceeds to the point 430 where the 4WD flag is cleared to zero. Otherwise, the program proceeds to the point 424.

After the 4WD flag is cleared, at the point 432, the target torque T is set at the control torque $T_1$. At the point 434 in the program, a determination is made as to whether or not the target torque T is zero. If the answer to this question is "no", then the program proceeds to the point 426. Otherwise, the program proceeds to the point 436 where the dither current $i^*$ is set at its minimum value required to assure the dither amplitude as $i^*=\Delta i \pm \Delta i \cdot f_0$. Following this, the program proceeds to the point 438.

At the point 438 in the program, a dither current $i^*$ (for example, $i \pm 0.1$A, 100 Hz) is supplied to the solenoid valve 54 so as to provide the target torque T at the transfer clutch 28. Following this, the program proceeds to the end point 440.

In the third embodiment, the minimum torque $T_{min}$ depends on the vehicle speed $V_{CAR}$. The higher the vehicle speed $V_{CAR}$, the greater the minimum torque $T_{min}$. The minimum torque $T_{min}$ is used to judge whether an appropriate 4WD control is required. This is effective to avoid such an erroneous judgement that the vehicle is moving on a road surface having a low friction factor in spite of the fact that the road surface has a great friction factor when there is a difference between tire diameters.

While the invention has been described in connection with the starting torque $T_2$ and the initial torque $T_3$ used as vehicle condition dependent torques, the hunting dependent torque, the clutch protection torque, the ABS operation torque, limit torque, the longitudinal acceleration torque, the deceleration torque, and the failsafe torque may be used singly or in combination as vehicle condition dependent torques.

While the invention has been described in connection with a 4WD vehicle where the rear wheels are the primary drive wheels and the front wheels are the secondary drive wheels, it is to be understood that the invention is also applicable to another 4WD vehicle where the front wheels are the primary drive wheels and the rear wheels are the secondary drive wheels.

What is claimed is:

1. A torque split control apparatus for use with an automotive vehicle including an engine for producing a drive, the automotive vehicle being supported on a pair of primary drive wheels and a pair of secondary drive wheels, the apparatus comprising:

means for transmitting the drive from the engine to the primary drive wheels and to the secondary drive wheels through a torque distributing clutch for varying a torque transmitted to the secondary drive wheels;

means for sensing a wheel speed difference between speeds of rotation of the primary and secondary drive wheels;

means for calculating a control torque to be transmitted through the torque distributing clutch to provide a desired turning characteristic to the vehicle based on the sensed wheel speed difference;

means for calculating at least one torque dependent on a specified vehicle operating condition, the one torque including an initial torque produced as a function of vehicle lateral acceleration;

means for monitoring vehicle operating conditions to produce a command signal when a 4WD control is demanded;

means for selecting the control torque in the absence of the produced command signal and a greater one of the control torque and the vehicle operating condition dependent torque in the presence of the produced command signal; and means for controlling the torque distributing clutch to transmit the selected control torque to the secondary drive wheels.

2. The torque split control apparatus as claimed in claim 1, wherein the means for calculating at least one vehicle condition dependent torque includes means for calculating a starting torque as a function of vehicle speed, and means for calculating an initial torque as a function of vehicle lateral acceleration.

3. The torque split control apparatus as claimed in claim 2, wherein the means for monitoring vehicle operating conditions to produce a command signal includes means for producing the command signal only when a condition where the control torque is greater than a greater one of first and second torques occurs once or more before a total vehicle travelling distance exceeds a predetermined value, the first torque being the starting torque set at 0 when the vehicle speed is less than a predetermined speed value and set at a predetermined torque value when the vehicle speed exceeds the predetermined speed value, the second torque being the initial torque set when the vehicle is moving in a straight line.

4. The torque split control apparatus as claimed in claim 2, wherein the means for monitoring vehicle operating conditions to produce a command signal includes means for interrupting the command signal when a period during which the control torque remains at a minimum value exceeds a predetermined time for a predetermined number of repetitive operations of starting and stopping the vehicle.

5. The torque split control apparatus as claimed in claim 2, wherein the means for monitoring vehicle operating conditions to produce a command signal includes means for producing the command signal only when a condition where the control torque is greater than a greater one of first and second torques occurs once or more during a predetermined number of repetitive operations of starting and stopping the vehicle, the first torque being the starting torque set at zero when the vehicle speed is less than a predetermined value and set at a predetermined speed value when the vehicle speed exceeds the predetermined speed value, the second torque being the initial torque set when the vehicle is moving in a straight line.

6. The torque split control apparatus as claimed in claim 2, wherein the means for monitoring vehicle operating conditions to produce a command signal includes means for calculating a minimum torque as a function of vehicle speed and, means for producing the command signal only when a condition where a period during which the control torque remains equal to or greater than the minimum torque exceeds a predetermined time occurs once or more.

7. The torque split control apparatus as claimed in claim 6, wherein the greater the vehicle speed, the greater the minimum torque.

8. The torque split control apparatus as claimed in claim 1, wherein the means for controlling the torque distributing clutch includes a solenoid valve responsive to a dither current for controlling a control pressure of the torque distributing clutch, and means for controlling the dither current to transmit the selected torque to the secondary drive wheels.

9. The torque split control apparatus as claimed in claim 1, wherein the means for controlling the torque distributing clutch includes a solenoid valve responsive to a dither current for controlling a control pressure of the torque distributing clutch, and means for controlling the dither current such that, when the control torque is zero in the absence of the command signal, the dither current is set at the minimum value required to assure a predetermined dither amplitude, but otherwise the dither current is controlled to assure transmission of the selected torque to the secondary drive wheels.

* * * * *